(12) United States Patent
Reed et al.

(10) Patent No.: US 7,543,884 B2
(45) Date of Patent: Jun. 9, 2009

(54) CLAM SHELL BRACKET CONNECTING AUTOMOTIVE STRUCTURAL MEMBERS

(75) Inventors: John T. Reed, Hudson, OH (US); Henry Hausler, Manchester, MI (US); Jason S. Balzer, Commerce, MI (US); Lawrence A. Queener, Pinckney, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 11/928,002

(22) Filed: Oct. 30, 2007

(65) Prior Publication Data

US 2009/0108634 A1 Apr. 30, 2009

(51) Int. Cl.
*B60J 7/00* (2006.01)
(52) U.S. Cl. .................. 296/210; 296/203.01
(58) Field of Classification Search .......... 296/210, 296/104, 122, 193.05, 203.01; D25/56; 454/136; 405/288; 52/45; 248/237
See application file for complete search history.

(56) References Cited

U.S. PATENT DOCUMENTS

| | | | | |
|---|---|---|---|---|
| 4,252,364 A | * | 2/1981 | Toyama et al. | 296/203.01 |
| 4,775,181 A | * | 10/1988 | Shoda | 296/210 |
| 5,018,781 A | | 5/1991 | Kumasaka | 296/210 |
| 5,226,696 A | * | 7/1993 | Klages et al. | 296/203.01 |
| 5,318,338 A | * | 6/1994 | Ikeda | 296/210 |
| 5,681,076 A | * | 10/1997 | Yoshii | 296/210 |
| 5,716,155 A | * | 2/1998 | Yoshida et al. | 403/187 |
| 5,829,219 A | * | 11/1998 | Sugawara et al. | 296/205 |
| 6,073,992 A | * | 6/2000 | Yamauchi et al. | 296/203.01 |
| 6,073,993 A | | 6/2000 | Iwatsuki | 296/203.04 |
| 6,099,362 A | | 8/2000 | Hine | 280/781 |
| 6,126,232 A | * | 10/2000 | Nakano | 296/210 |
| 6,578,909 B1 | * | 6/2003 | Reed et al. | 296/210 |
| 7,243,985 B2 | * | 7/2007 | Yatabe et al. | 296/203.01 |
| 2005/0253422 A1 | * | 11/2005 | Tomozawa | 296/210 |
| 2008/0030050 A1 | * | 2/2008 | Chen et al. | 296/210 |

* cited by examiner

*Primary Examiner*—Kiran B. Patel
(74) *Attorney, Agent, or Firm*—Frederick Owens, Esq.; Miller Law Group, PLLC

(57) ABSTRACT

A structural joint configuration is used in an automotive body structure in which a transverse roof cross member has a convoluted formed shape that must be connected to the longitudinally extending tubular roof side rail. A two-piece clam shell bracket forms the joint apparatus. A lower piece formed in a shape to mate to and receive the transverse roof cross member is welded to the underside of the tubular roof side rail while projecting a formed receiver to engage the transverse roof cross member. An upper piece clamps over top of the transverse roof cross member and is welded to the top portion of the tubular roof side rail. The joint apparatus can be secured to the transverse roof cross member and to the roof side rail by either welding or by adhesives to provide a reinforcement at the joint between the two structural members.

12 Claims, 3 Drawing Sheets

CLAM SHELL BRACKET CONNECTING AUTOMOTIVE STRUCTURAL MEMBERS

FIELD OF THE INVENTION

This invention relates generally to an automotive body structure and, more particularly, to a two-piece bracket that can be used to connect one structural member to another.

BACKGROUND OF THE INVENTION

Manufacturing processes for automobiles have evolved from one that utilized MIG welding processes, i.e. a welding process in which a line of molten material is deposited by the welder in joining two pieces of metal together. Spot-welding, a process involving the passage of electrical current between two electrodes to melt and join two pieces of metal placed between the electrodes, is being utilized in a greater degree in the manufacturing of automotive vehicles. Spot-welding requires a body structure design that is conducive to being manufactured using the spot-welding process. For example, if two tubular members are being spot-welded, access to the adjoining walls of the two tubular members by the spot-welder electrodes must be provided.

The joinder of hydroformed body structure members presents a problem for body structure construction in automobiles. If the body structure members are positioned in a parallel orientation, the contiguous sides of the two body structure members can be spot-welded together with the electrodes being inserted through openings formed during the hydroforming process in the respective opposing sides of the body structure members.

Since hydroformed body structure members are tubular in configuration, the body structure members have open ends. Therefore, welding the connection of a body structure member that is butted against a lateral side of another body structure member presents a welding problem that is conventionally solved by MIG welding processes with the edges of the butted body structure member being welded to the sides of the adjoining body structure member. If the body structure member being butted against the lateral side of the other body structure member is physically smaller that the other body structure member, the smaller body structure member can be inserted into an opening formed in the other body structure member so that the smaller body structure member butts or aligns with the opposing surface of the larger body structure member and the respective sides of the body structure members can be spot-welded together if the body structure members are sized appropriately. However, such welding techniques do not work if the two body structure members are not sized to snuggly fit together before being spot-welded.

In U.S. Pat. No. 5,018,781, granted to Hideyuki Kumasaka, et al on May 28, 1991, the front roof rails, rear roof rails and side roof rails comprise separate components that are connected together using mounting flanges that are formed into the side rail components. A mounting bracket is disclosed in U.S. Pat. No. 5,226,696, granted to Ulrich Klages, et al on Jul. 13, 1993, but the configuration requires that the roof side rail be notched to receive the bracket, which requires added manufacturing expense and weakens the roof side rail.

A cup-shaped damper mounting portion and a bracket portion are welded together to form a rear damper base that is connected to the rear pillar in U.S. Pat. No. 6,073,993, issued on Jun. 13, 2000, to Syuichiro Iwatsuki, et al; however, this structure is not utilized on an automotive roof structure. The body structure for a sport utility vehicle disclosed in U.S. Pat. No. 6,099,362, issued to Alan Hine on Aug. 8, 2000, teaches a U-shaped joint connecting mechanism that are welded to the side rail members and a pair of rail plates. This patent suggests that this structure can be utilized for roof bows and headers to improve torsional rigidity.

The prior art described above does not suggest the connection of a transversely extending formed and convoluted roof cross member, such as a header or a bow, to a hydroformed tubular member in a manner that would add strength to the joint. Accordingly, it would be desirable to provide an apparatus that would be operable to mount a shaped transverse roof cross member to tubular side rails.

SUMMARY OF THE INVENTION

It is an object of this invention to overcome the aforementioned disadvantages of the known prior art by providing a joint configuration for the mounting of a transverse roof cross component to a tubular roof side rail in an automobile.

It is another object of this invention to provide a joint apparatus that will add to the strength of a joint where a transverse roof component is joined to a tubular roof side rail.

It is a feature of this invention that the joint apparatus is formed in a two-piece configuration to secure a transverse roof cross component to the roof side rail.

It is an advantage of this invention that the connection of the transverse roof cross component through the two-piece mounting bracket adds to the strength of the joint.

It is another feature of this invention that the bottom portion of the joint apparatus is formed in a shape to mate with the formed shape of the transverse roof cross component.

It is still another feature of this invention that the lower portion of the joint apparatus is welded to the underside of the tubular roof side rail and project inwardly therefrom to receive the transverse roof cross component.

It is another advantage of this invention that the joint apparatus improves the strength of the joint without adding processing costs for notching the roof side rail to receive a mounting bracket.

It is still another advantage of this invention that the joint apparatus acts as a rail reinforcement at the joint between the roof side rail and the transverse roof cross component.

It is yet another feature of this invention that the upper portion of the joint apparatus will clamp across the top of the transverse roof cross component and be affixed to the roof side rail and the transverse roof cross component.

It is yet another advantage of this invention that the two-piece joint apparatus can be secured through welding or by adhesives.

It is a further object of this invention to provide a joint configuration for use in mounting a transverse roof cross component to a generally orthogonal roof side rail in an automotive body structure that is durable in construction, inexpensive of manufacture, carefree of maintenance, facile in assemblage, and simple and effective in use.

These and other objects, features and advantages are accomplished according to the instant invention by providing a structural joint configuration for use in an automotive body structure in which a transverse roof cross member has a convoluted formed shape that must be connected to the longitudinally extending tubular roof side rail. A two-piece clam shell bracket forms the joint apparatus. A lower piece formed in a shape to mate to and receive the transverse roof cross member is welded to the underside of the tubular roof side rail while projecting a formed receiver to engage the transverse roof cross member. An upper piece clamps over top of the transverse roof cross member and is welded to the top portion of the tubular roof side rail. The joint apparatus can be secured to the transverse roof cross member and to the roof side rail by either welding or by adhesives to provide a reinforcement at the joint between the two structural members.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
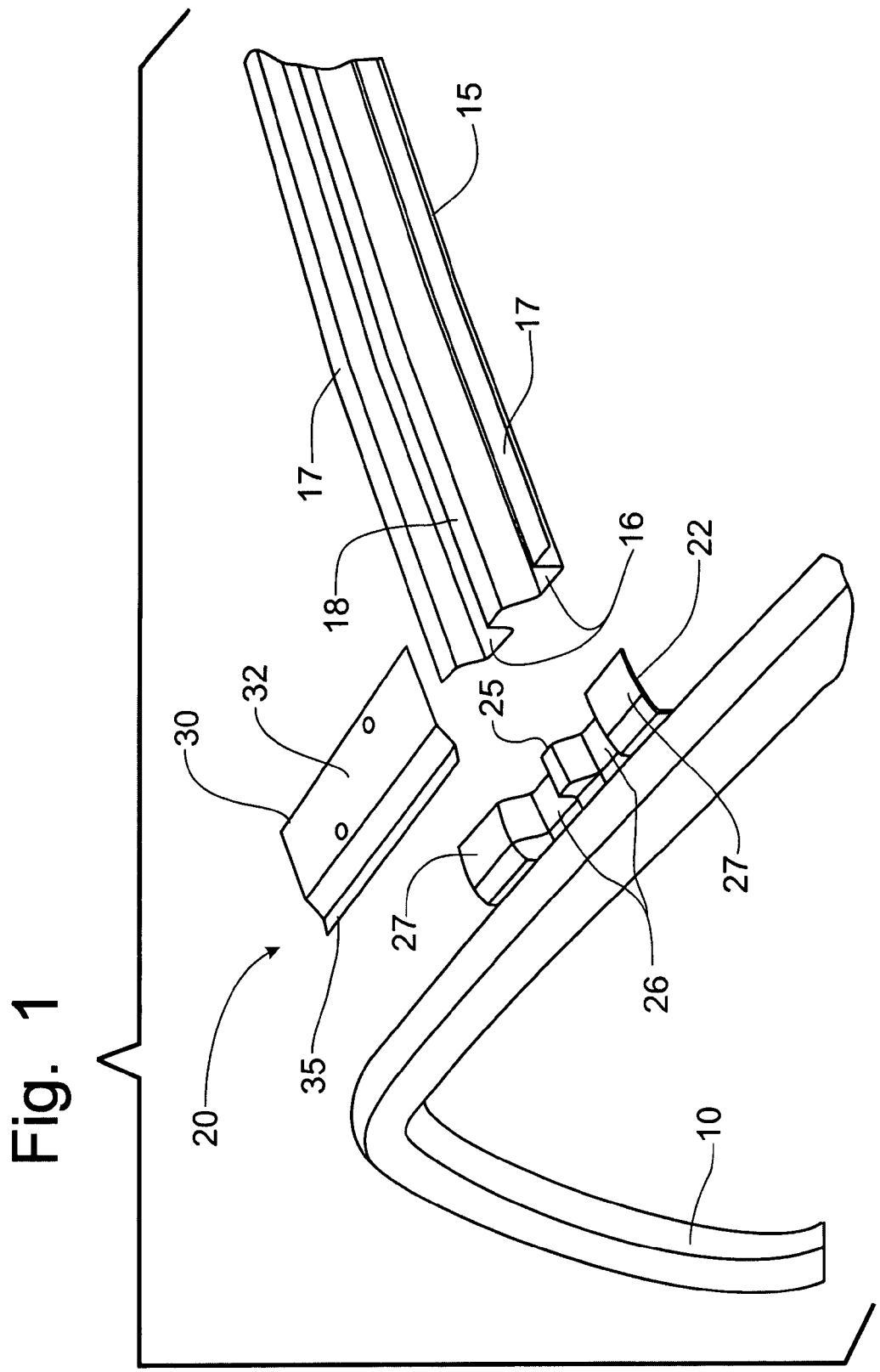
FIG. 1 is an exploded perspective view of a joint in an automotive roof structure between a longitudinally extending roof side rail and a transverse roof cross member, incorporating the principles of the instant invention.
Figure 2:
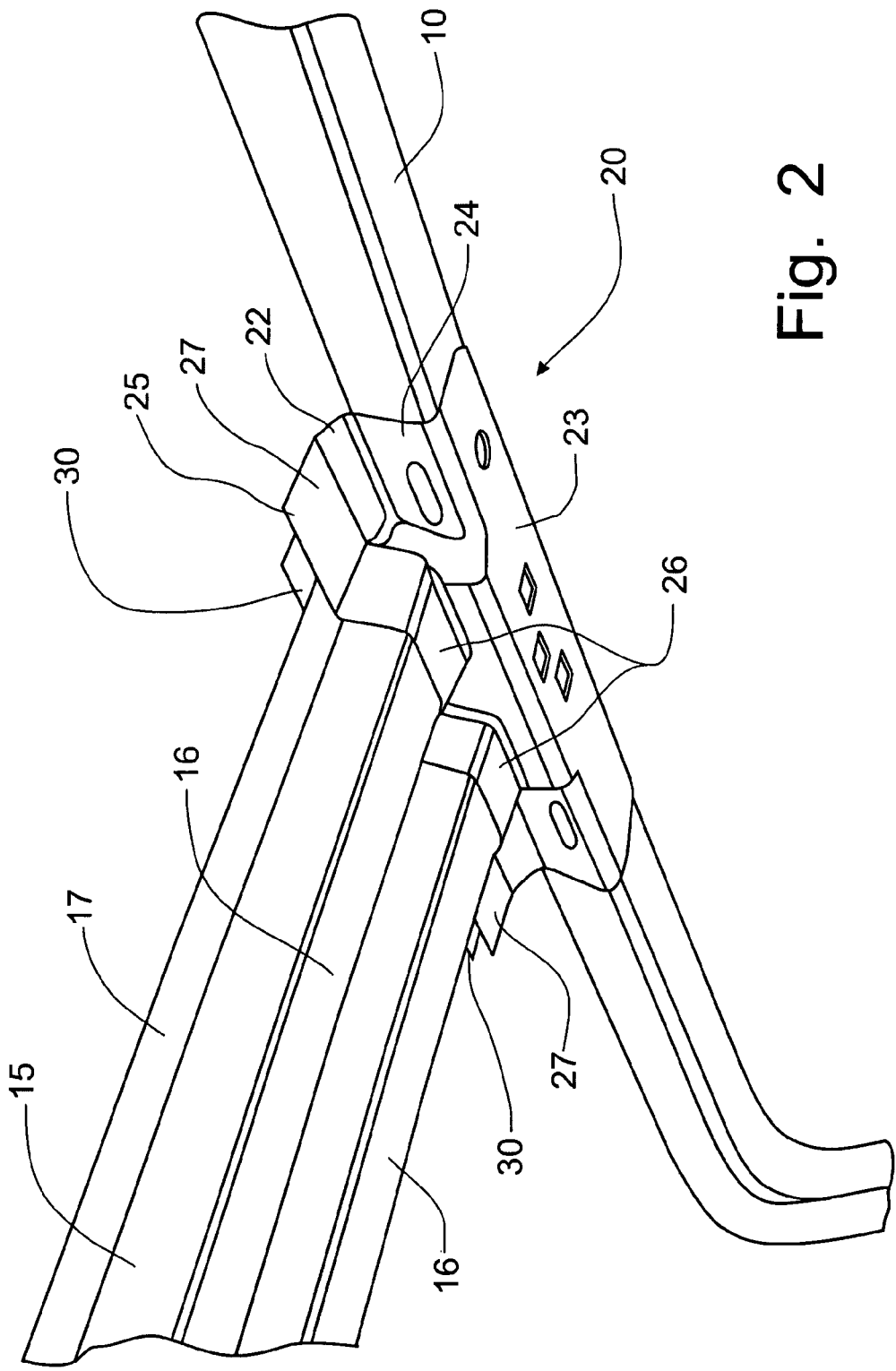
FIG. 2 is a lower perspective view of the joint formed according to the principles of the instant invention.
Figure 3:
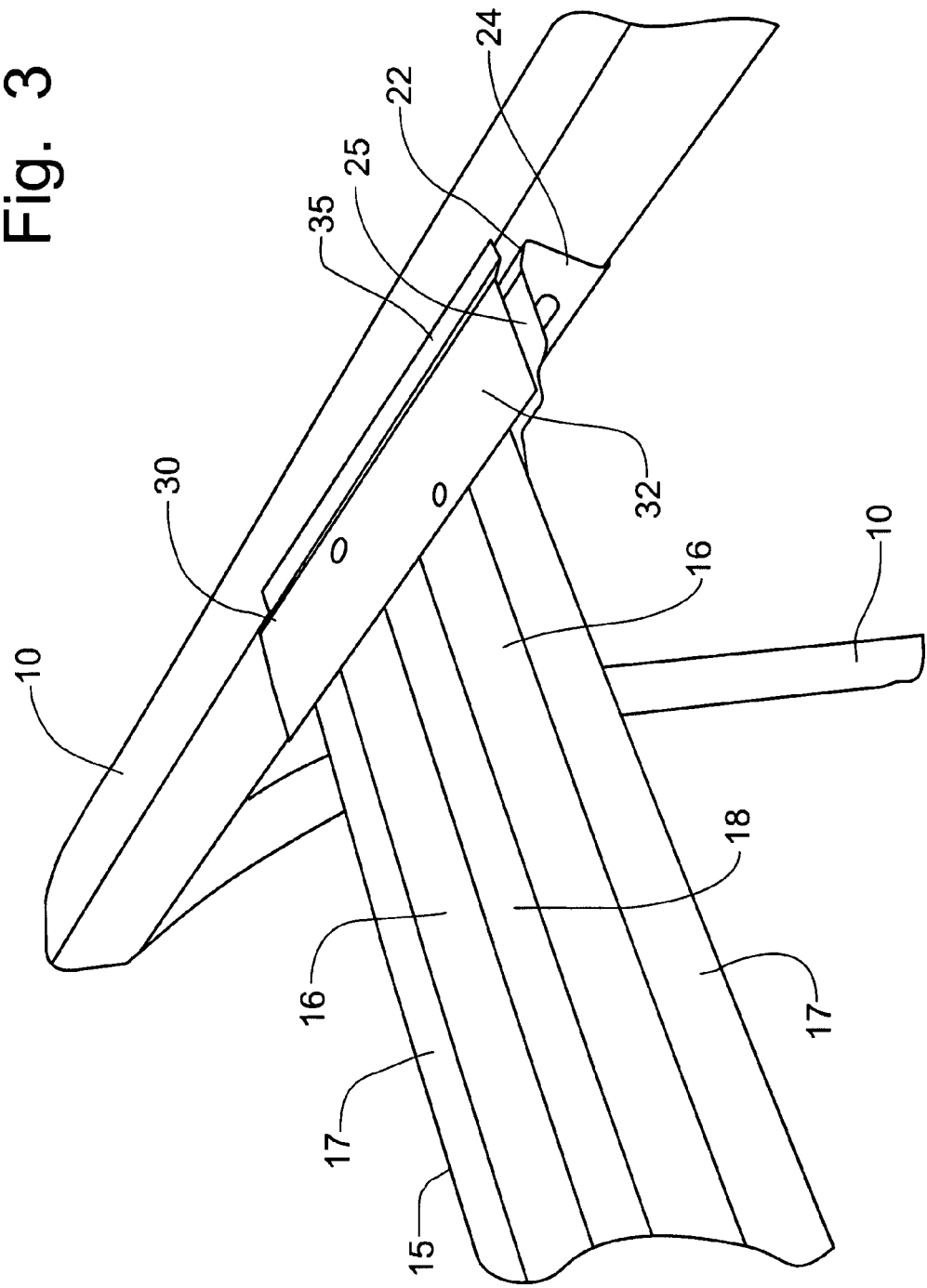
FIG. 3 is an upper perspective view of the joint shown in FIG. 2.

Referring to the drawings, a body structure configuration for an automotive vehicle incorporating the principles of the instant invention can best be seen. This particular body structure configuration is directed to the mounting of transverse roof cross members, such as the header or the bow member, to a tubular roof side rail member that can be formed through a hydroforming process. Automotive transverse roof cross members 15 are typically formed in a shaped, convoluted configuration, such as is exemplarily shown in FIG. 1, to provide strength to the member. These shaped members 15 can be manufactured from any standard material including, in the way of examples, steel, aluminum, composites, nylon and magnesium, and manufactured through any known process including hot-stamping, cold stamping, hydroforming and extrusion. The roof side rails 10 can be manufactured from formed hat-shaped members, but modern techniques are utilizing tubular members that can be formed through a rolling process, but most often are formed through a manufacturing process called hydroforming.

Hydroforming is a process by which a standard tubular stock member is placed into a form shaped to correspond to the particular member to be formed. A liquid is then introduced into the interior of the tubular stock and pressurized until the tubular stock expands to assume the shape defined by the configured form. The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, an automotive body structure can be created using in large part hydroformed tubular members.

Because of the diverse shape of the roof cross member 15 as compared to the roof side rail 10 the connection of the roof cross member 15 to the roof side rail 10 is not intuitive. Furthermore, the joint between the transversely extending roof cross member 15 and the roof side rails 10 needs to be as strong as the body structure members 10, 15 so that the roof will be able to withstand crushing loads, such as imposed on the automotive body structure during a rollover event. The solution to creating this joint 19 between roof cross members 15 and roof side rails 10, according to the principles of the instant invention, is a two-piece clam shell bracket 20. The clam shell bracket 20 includes a lower member 22 and an upper member 30 which sandwich the roof cross member 15 therebetween, as is discussed below.

The lower member 22 includes a generally planar first portion 23 oriented to be engagable with the underside of the roof side rail 10, a transition portion 24 oriented to be positioned adjacent a side surface of the roof side rail, and a mounting portion 25, preferably formed in a shaped configuration to mate with the corresponding cross-sectional configuration of the transverse roof cross member 15. In the example of the bow member 15 shown in the drawings, the bow member 15 has a stamped (or extruded) double hat-shaped cross-sectional shape forming two valleys 16 and spaced side flanges 17. Similarly, the mounting portion 25 is similarly formed with two valleys 26 and opposing raised plateaus 27. Accordingly, the roof cross member 15 will nest on top of the mounting portion 25 of the lower member 22 of the clam shell 20. The first portion 23 and the transition portion 24 of the lower member 22 is shaped to correspond to the formed shape of the roof side rail 10 so that both the first portion 23 and the transition portion 24 will be placed against the corresponding surfaces of the roof side rail 10 to enable the lower member 22 to be welded or affixed by adhesives, or other suitable method of affixing, to the roof side rail 10.

The upper member 30 caps the transverse roof cross member 15 when received within the mounting portion 25 and sandwiches the transverse roof cross member 15 between the upper member 30 and the lower member 22. The upper member 30 is formed with a generally planar top portion 32, that will press against the two flanges 17 and the central plateau 18 of the roof cross member 15 to cap the roof cross member 15 against the mounting portion 25 of the lower member 22. A second portion 35 of the upper member 30 overlies the upper surface of the roof side rail 10 to enable the upper member 30 to be welded or adhered to the roof side rail 10.

With this configuration of a clam shell bracket 20, the transverse roof cross member 15 can be welded or adhered to the mounting portion with the adjacent valleys 16, 26 being secured together. The capping of the roof cross member 15 by the upper member 30 enables the corresponding flanges 17, 27 and the central plateau 18 to be welded or adhered together, providing a very strong joint between the roof cross member 15 and the roof side rail 10. Furthermore, the clam shell bracket 20, since both the lower and upper members 22, 30 increase the overall thickness of the roof side rail 10 where joined to the roof side rail 10, serves to reinforce both the roof cross member 15 and the roof side rail 10 at the location of the joint since the lower and upper members 22, 30 overlie both the body structure members 10, 15. Thus, the clam shell bracket 20 enhances body strength and stiffness without requiring addition manufacturing processes like notching the roof side rail 10 to accommodate the connection of the roof cross member 15.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an automotive vehicle having a roof side rail extending generally longitudinally and a roof cross member extending generally transversely, the roof side rail being formed as a tubular member and the roof cross member having a formed cross-sectional configuration, the improvement comprising:

a clam shell bracket joining the roof cross member to the roof side rail, the clam shell bracket including:

a lower member having a first portion affixed to an underside surface of the roof side rail and a mounting portion projecting away from the roof side rail to receive the roof cross member thereon; and an upper member having a top portion that overlies the roof cross member when received on the mounting portion and a second portion that is affixed to a top surface of the roof side rail.

2. The automotive vehicle of claim 1 wherein the mounting portion is formed with a shape to conform to the cross-sectional configuration of the roof cross member so that the roof cross member will nest in the mounting portion when received thereon.

3. The automotive vehicle of claim 2 wherein the first portion is generally planar and is integrally connected to the mounting portion by a transitional portion, the first portion and the transition portion being configured relative to one another to mate against corresponding surfaces of the roof side rail when the lower member is properly secured to the roof side rail.

4. The automotive vehicle of claim 3 wherein the upper and lower members increase an overall thickness dimension of the roof side rail when the upper and lower members are affixed to the roof side rail.

5. The automotive vehicle of claim 4 wherein the lower member is affixed to the roof side rail, the roof cross member is affixed to the mounting portion of the lower member, and the upper member is affixed to both the roof cross member and the roof side rail by welding.

6. The automotive vehicle of claim 4 wherein the lower member is affixed to the roof side rail, the roof cross member is affixed to the mounting portion of the lower member, and the upper member is affixed to both the roof cross member and the roof side rail by adhesives.

7. An automotive vehicle comprising:

a roof side rail extending generally longitudinally and a roof cross member extending generally transversely, the roof side rail being formed as a tubular member and the roof cross member having a formed cross-sectional configuration; and a clam shell bracket joining the roof cross member to the roof side rail, the clam shell bracket including:

a lower member having a first portion affixed to an underside surface of the roof side rail and a mounting portion projecting away from the roof side rail to receive the roof cross member thereon; and an upper member having a top portion that overlies the roof cross member when received on the mounting portion and a second portion that is affixed to a top surface of the roof side rail.

8. The automotive vehicle of claim 7 wherein the mounting portion is formed with a shape to conform to the cross-sectional configuration of the roof cross member so that the roof cross member will nest in the mounting portion when received thereon.

9. The automotive vehicle of claim 8 wherein the first portion is generally planar and is integrally connected to the mounting portion by a transitional portion, the first portion and the transition portion being configured relative to one another to mate against corresponding surfaces of the roof side rail when the lower member is properly secured to the roof side rail.

10. The automotive vehicle of claim 9 wherein the upper and lower members increase an overall thickness dimension of the roof side rail when the upper and lower members are affixed to the roof side rail.

11. The automotive vehicle of claim 10 wherein the lower member is affixed to the roof side rail, the roof cross member is affixed to the mounting portion of the lower member, and the upper member is affixed to both the roof cross member and the roof side rail by welding.

12. The automotive vehicle of claim 10 wherein the lower member is affixed to the roof side rail, the roof cross member is affixed to the mounting portion of the lower member, and the upper member is affixed to both the roof cross member and the roof side rail by adhesives.

\* \* \* \* \*